United States Patent

[11] 3,573,522

[72] Inventor  Alex M. Pentland
              Ann Arbor, Mich.
[21] Appl. No. 888,278
[22] Filed     Dec. 29, 1969
[45] Patented  Apr. 6, 1971
[73] Assignee  Ford Motor Company
               Dearborn, Mich.

[54] DYNAMOELECTRIC MACHINE INCLUDING BRUSH HOLDING MEANS
     10 Claims, 7 Drawing Figs.

[52] U.S. Cl. .................................................. 310/239,
                                                              310/242
[51] Int. Cl. ........................................... H01r 39/38
[50] Field of Search............................................ 310/239,
                                               242, 244, 245, 240, 247

[56]                References Cited
              UNITED STATES PATENTS
1,517,281  12/1924  Ehrlich.......................... 310/241
1,520,237  12/1924  Gilchrist....................... 310/239
2,737,605  3/1956   Wagner et al.................. 310/241
3,493,802  2/1970   Barthruff et al. ............. 310/247

Primary Examiner—D.F. Duggan
Attorneys—John R. Faulkner and Keith L. Zerschling

ABSTRACT: This disclosure relates to a dynamoelectric machine having brush holding means which comprises essentially a single-piece brush holder constructed of an insulating material for slidingly receiving brushes that engage a cylindrical portion of a commutator. This brush holder is positioned within the machine by engagement with the stator in such a position that slots positioned therein are located radially outwardly of the cylindrical portion of the commutator. The brushes of the machine are received within these slots so that the brush holder does not limit movement of the brushes in an axial direction with respect to the cylindrical portion of the commutator. Axial movement of the brushes is limited by having one surface of each brush positioned closely adjacent to or in engagement with the riser of the commutator and by having another surface of each brush positioned in close proximity to or in engagement with an insulating washer.

Patented April 6, 1971

INVENTOR.
ALEX M. PENTLAND
BY John R. Faulkner
Keith L. Zerschling
ATTORNEYS

INVENTOR.
ALEX M. PENTLAND
BY
John R. Faulkner
Keith L. Zerschling
ATTORNEYS

DYNAMOELECTRIC MACHINE INCLUDING BRUSH HOLDING MEANS

BACKGROUND OF THE INVENTION

This invention relates generally to a dynamoelectric machine and, in particular, to a dynamoelectric machine including brush holder means.

In dynamoelectric machines, such as, an electric motor or generator, a complex mechanism comprising many various components is usually employed to hold the current collecting brushes of the machine in engagement with a current collector member or commutator. In many dynamoelectric machines, these brushes are individually mounted on various levers and springs which hold the brush in engagement with the current collector member or commutator.

The construction of these many parts is generally expensive from a manufacturing standpoint, i.e. it is expensive to fabricate each of these individual components. Moreover, the assembly time that is necessary to properly assembly these various components or parts in the machine is lengthy and is therefor expensive.

The present invention provides a very uncomplicated and inexpensive brush-holder means for holding the brushes of a dynamoelectric machine in engagement with the current collector or commutator thereof. In addition, the assembly time required for properly assembling the brush holder and the brushes in the machine is reduced to an absolute minimum.

SUMMARY OF THE INVENTION

This invention includes a substantially one-piece brush holder for holding a plurality of brushes of a dynamoelectric machine in engagement with the current collector or commutator thereof. This one-piece brush holder has a central opening positioned therein which receives the current collector member or commutator of the machine and it is positioned axially in the machine by means of a plurality of axially extending slots positioned around the periphery thereof. Each of these slots has a radially extending wall covering one of the ends thereof and these walls define a plane. The stator or frame of the dynamoelectric machine has a plurality of complementary tabs positioned thereon and each of these tabs has an end wall extending in a radial direction. The end walls of these tabs define a plane which is positioned substantially perpendicular to the axis of the rotor including the current collector member or commutator of the machine. The end walls of the slots in the brush holder are positioned in engagement with the end walls of these tabs to position the brush holder axially in the machine and to position it so that the axis of the central opening is parallel to, and preferably coincident with, the axis of the rotor including the current collector or commutator.

The brush holder also has a plurality of radially extending slots which extend outwardly from the central opening and these slots receive the brushes for the machine. The brush holder does not limit the axial movement of the brushes. This is accomplished by having the slots positioned so that one edge of each brush is in close proximity to the riser of the current collector member or commutator which extends in a direction substantially perpendicular to the axis of the remaining or cylindrical portion of the current collector member or commutator. As a result, the axial movement of the brushes is limited in one direction by the riser of the current collector member or commutator. The axial movement of the brushes is limited in the other direction by an insulating washer positioned in close proximity or in engagement with another edge of the brushes. This washer is held in place and engages the end cap of the dynamoelectric machine.

In the assembly of the brush holder and brushes, the one-piece brush holder mentioned above is dropped into place in the dynamoelectric machine so that the end walls of the slots in the brush holder engage the end walls on the tabs of the frame or stator of the machine. The brushes of the machine may then be inserted in the slots in the brush holder in an axial direction, i.e. they may be dropped into these slots if the machine is positioned so that the axis of the rotor or commutator is in a vertical direction. Spring means positioned on the brush holder are then suitably positioned in engagement with the ends of the brushes to force them into engagement with the cylindrical portion of the current collector or commutator. The insulating washer is then positioned over the brushes and the brush holder and the end cap of the machine is set in place over the insulating washer and the end of the frame. Through bolts or any suitable fastening means may then be employed to secure the end cap to the frame.

DESCRIPTION OF THE PREFERRED EMBODIMENT

Figure 1:
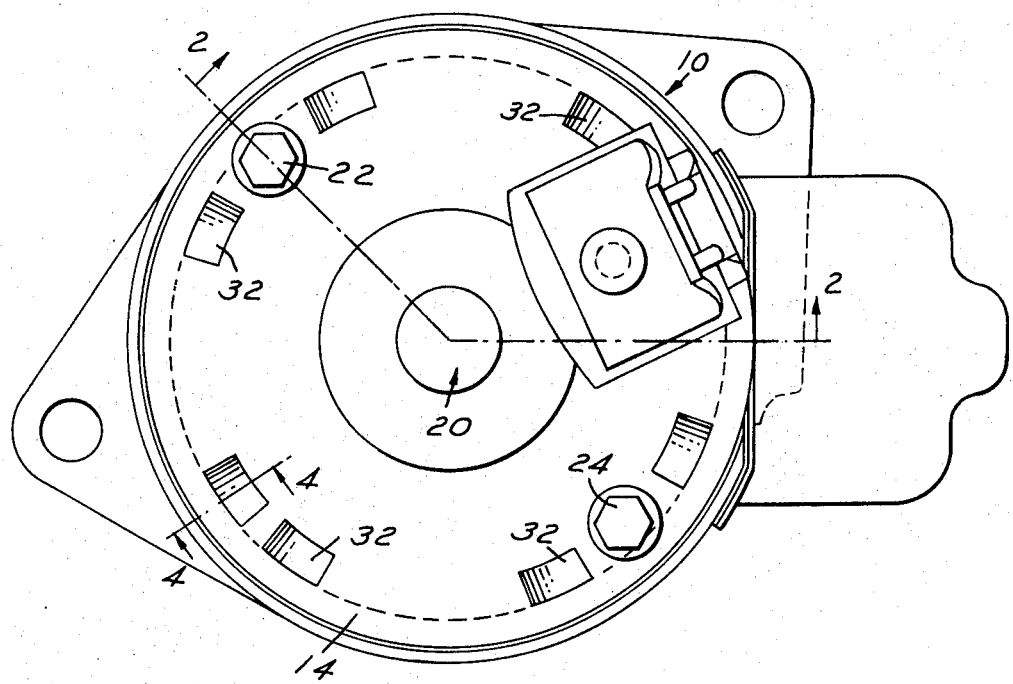
FIG. 1 is an end elevational view of a dynamoelectric machine of the present invention.
Figure 2:
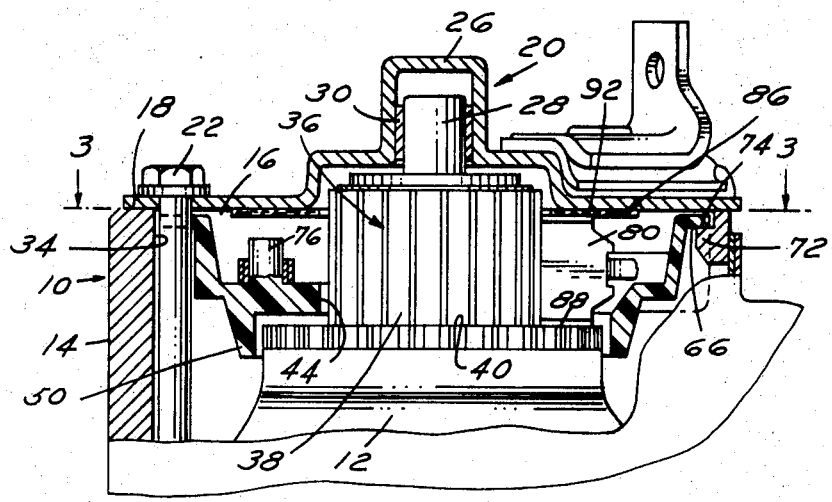
FIG. 2 is a sectional view partially in elevation taken along the lines 2–2 of FIG. 1.

Referring now to the drawings in which like reference numerals designate like parts throughout the several views thereof, there is shown in FIGS. 1 and 2 the dynamoelectric machine of the present invention which comprises a stator generally designated by the numeral 10 having a rotor 12 rotatably mounted therein. The stator 10 includes a frame 14 which is of generally cylindrical or annular configuration and has an open end 16 which includes a flat annular surface 18.

Figure 4:
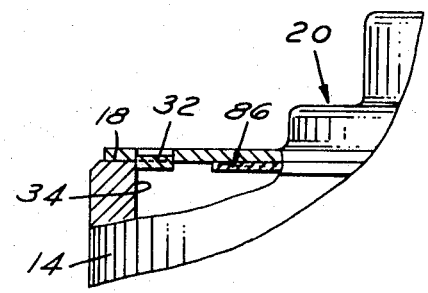
FIG. 4 is a partial sectional view partially in elevation taken along the lines 4–4 of FIG. 1.

The stator 10 of the dynamoelectric machine also includes an end plate or bell 20 which is suitably secured to the frame 14 of the stator 10 by a pair of through bolts 22 and 24. This end cap or bell 20 has an axially extending cup 26 which rotatably supports one end of shaft 28 of the rotor 12 by means of a conventional sleeve bearing 30. The end cap or bell 20 is suitably located with respect to the frame 14 of the stator 10 by a plurality of struck-in tabs 32. The outer surface of these tabs engage the inner surface 34 of the frame 14 as can readily be seen by an inspection of FIGS. 1 and 4. This properly locates the end cap or bell 20 within the frame 14 so that the bearing 30 is properly aligned to receive the end of the shaft 28 of the rotor 12.

Referring now to FIG. 2, the rotor 12 as shown may be the armature of a direct current dynamoelectric machine and this armature includes a current collector member or commutator 36 having a generally cylindrical portion 38, the axis of which is coincident with the axis of the shaft 28. The current collector member or commutator 36 also has a riser portion 40 which extends radially from the generally cylindrical portion 38 and in a plane which is perpendicular to the axes of the generally cylindrical portion 38 and the shaft 28. This riser portion is employed to connect the segments of the generally cylindrical portion 38 with the windings of the rotor or armature 12.

Figure 5:
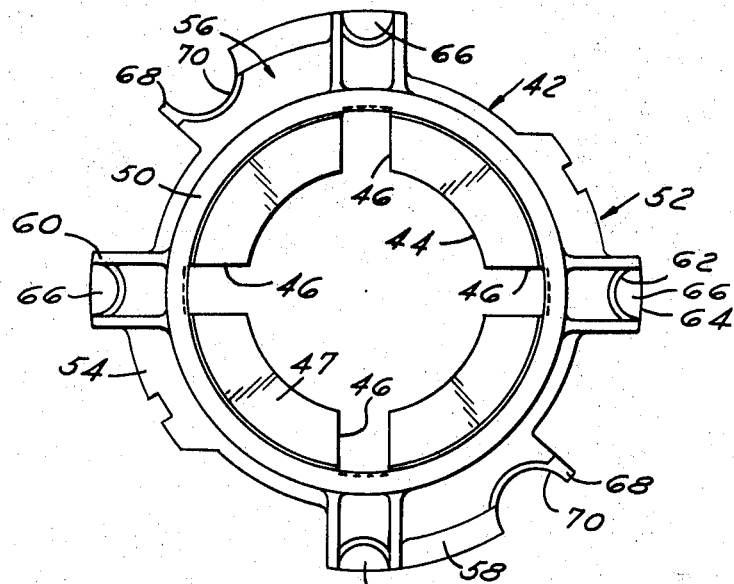
FIG. 5 is an elevational view of the brush holder of the present invention taken in the direction of the arrow 5 in FIG. 2.
Figure 6:
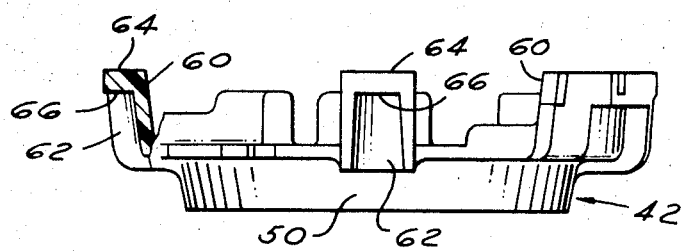
FIG. 6 is a side elevational view of the brush holder of the present invention.

Referring now to FIGS. 5 and 6, there is shown the one-piece brush holder of the present invention which is generally designated by the numeral 42. More specifically, FIG. 5 is an elevational view taken in the direction of the arrow 5 of FIG. 2 and it shows that the brush holder 42 includes a central opening 44 positioned therein. A plurality of brush receiving slots 46 extend radially outwardly from the central opening 44 thereby leaving a plurality of generally arcuate shaped segments 47 positioned between these slots. In addition, as can best be seen by reference to FIGS. 3 axially extending protrusions 48 and 49 are positioned on the outer surface of the one-piece brush holder 42 on each side of the slots 46 to provide increased axial length for the sidewalls thereof.

The brush holder 42 also includes an axially extending annular flange 50 which can be seen in both FIGS. 5 and 6. This flange not only adds rigidity to the one-piece brush holder 42 but also serves to limit the radial outward movement of the brushes of the machine. The one-piece brush holder 42 also includes a pair of opposed radially outwardly extending segments 52 and 54 and another pair of opposed radially outwardly extending segments 56 and 58. Each of the segments 52, 54, 56 and 58 has an axial extension 60 and each of these axial extensions 60 has a generally axially extending slot 62 terminated by an end wall 64. Each of the end walls 64 has a radially extending surface 66 and these surfaces 66 define a datam plane which is positioned substantially perpendicular to the central axis of the one-piece brush holder 42. In addition, each of the segments 56 and 58 has another axial extension 68, each of which has a slot 70 positioned therein for purposes to be described subsequently.

Figure 3:
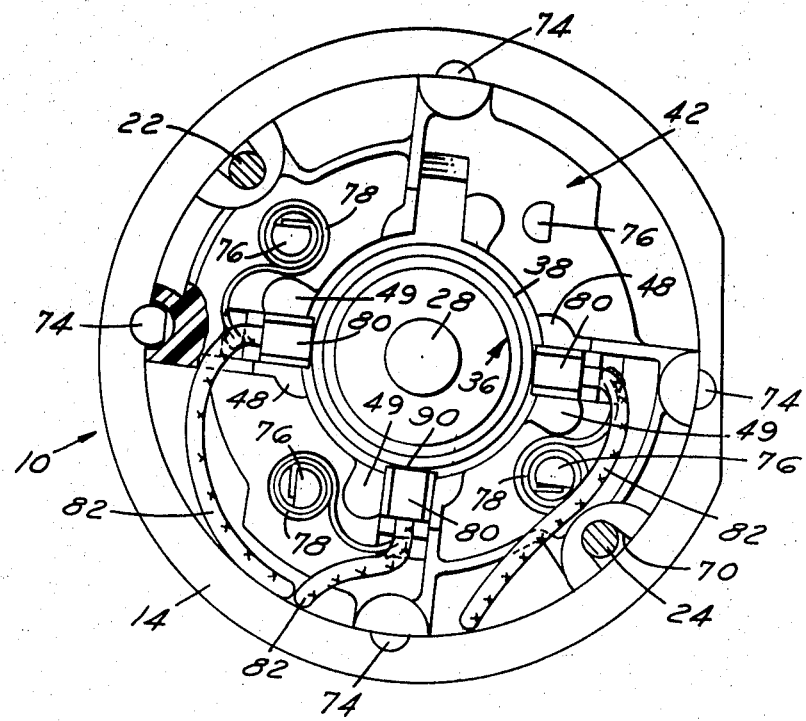
FIG. 3 is a sectional view partially in elevation taken along the lines 3–3 of FIG. 2.

Referring now to FIGS. 2 and 3, the frame 14 has a plurality of radially inwardly extending tabs 72 positioned on the inner surface 34 thereof adjacent the flat annular surface 18. These tabs may be struck from the material comprising the frame 14 and each of them has a radially inwardly extending surface 74 which defines a plane perpendicular to the axis of the frame 14, the axis of the rotor 12 and the axis of the cylindrical portion 38 of the current collector member or commutator 36 when the rotor 12 is mounted within the stator 10.

The one-piece brush holder 42 has a plurality of spaced posts 76 positioned on the outer surface thereof as can best be seen by reference to FIGS. 2 and 3. Each of these posts receives a coiled spring 78. These coiled springs are employed to bias the brushes 80 positioned in slots 46 of the brush holder 42 into engagement with the cylindrical portion 38 of the current collector member or armature 36 positioned on the rotor 12. Each of the brushes 80 is suitably connected to a lead 82 and the leads 82 are suitably connected to external circuitry or the field windings of the dynamoelectric machine 10.

Figure 7:
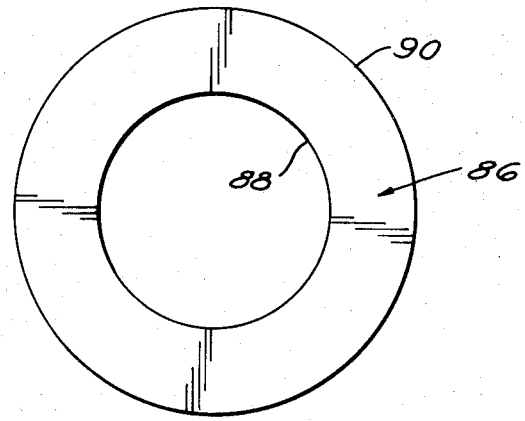
FIG. 7 is a plan view of the insulating washer shown in FIG. 2.

Referring now to FIGS. 2 and 7, there is shown an insulating washer 86 that has an inner diameter 88 slightly larger than the diameter of the cylindrical portion 38 of the current collector member or commutator 36. The outer diameter 90 of the washer 86 is dimensioned so that it covers the outer extremity of the brushes 80 to prevent them from being grounded against the end cap or bell 20.

In the assembly of the dynamoelectric machine of the present invention, the frame 14 and the rotor 12 may be positioned in an upright position as shown in FIG. 2 in any suitable fixture. At the start of the assembly operations, the end of the frame 14 and the end of the rotor 12 are exposed and the one-piece brush holder 42, the insulating washer 86, the end cap or bell 20 and the through bolts 22 and 24 are not in position. The coiled springs 78 are then positioned on the posts 76 of the one-piece brush holder 42 as seen in FIG. 3. The brushes 80 will be connected to the leads 82 in the frame 14 of the machine and these leads will be bent over the flat annular surface 18 on the frame 14 so that the brushes 80 are positioned axially upwardly of the flat annular surface 18 on the frame 14 when this mechanism is viewed as in FIG. 2.

The one-piece brush holder 42 is then dropped into position so that the radially outwardly extending surfaces 66 on the end walls 64 of slots 62 engage the radially extending surfaces 74 on the struck-in tabs 72 struck in the inner surface 34 of the frame 14. In this position, the slots 62 of the one-piece brush holder 42 receive the inwardly extending tabs 72 on the frame 14. Since the radially extending surfaces 74 on the struck-in tabs 72 define a plane substantially perpendicular to the axis of the frame 14, the axis of the rotor 12 and the axis of the cylindrical portion 38 of the commutator or current collector member 36, the engagement of the radially extending surfaces 66 of the brush holder 42 will position the brush holder 42 axially in the machine and will also assure that the axis of the brush holder 42 is positioned coincident to and in parallel relationship with the axis of the frame 14, the axis of the rotor 12 and the axis of the cylindrical portion 38 of the commutator or current collector member 36.

The outer surfaces of the axially extending extensions 60 fit snugly within the inner surface 34 of the frame 14 and thus position the one-piece brush holder 42 radially within the machine. As can be seen by reference to FIG. 2, the central opening 44 in the one-piece brush holder 42 fits over the cylindrical portion 38 of the current collector member or commutator 36 and the axially extending flange 50 of the one-piece brush holder 42 surrounds the riser 40 of the current collector member or commutator 36.

The positioning of the radially extending surfaces 66 of the end walls 64 of extensions 60 on the one-piece brush holder 42 in engagement with the radially extending flanges 74 of the inwardly extending tabs 72 on frame 14 similarly assure that the axes of the slots 46 and the sidewalls thereof are positioned in parallel relation to the axis of the cylindrical portion 38 of the current collector member or commutator 36.

After the brush holder 42 is so positioned within the frame 14, a suitable tool may be employed to move the ends 86 of the springs 78 radially outwardly. The brushes 80 may then be dropped vertically into position in the slots 46 of the one-piece brush holder 42 with one radially extending surface 88 positioned against or closely adjacent to the riser 40.

The ends 86 of the springs 78 are then released so that the axially extending surfaces 90 of the brushes 80 are urged into engagement with the cylindrical portion 38 of the current collector member or commutator 36.

The washer 86, which as stated previously is constructed of an insulating material, is then positioned over the cylindrical portion 38 of the commutator or current collector member 36 and in engagement with the other radially extending surface 92 of each of the brushes 80. This prevents the brushes from being grounded against the end cap or bell 20 which is next positioned over the frame 14 so that the inner surface thereof engages the flat annular surface 18 and the outer portion of the tabs 32 engage the inner surface 34 of the frame. Subsequently the through bolts 22 and 24 are positioned through suitable apertures in the end bell or cap 20 and they pass through the slots 70 positioned in the axial extensions 68 positioned on the one-piece brush holder 42 as can best been seen by reference to FIG. 3.

It can be readily appreciated by an inspection of FIG. 2 that the length of the cylindrical portion 38 of the current collector or commutator 36 can be reduced over that shown in this FIG. In fact, the length of this cylindrical portion 38 may be made exactly the same length as the width of the brush 80 shown in FIG. 2 since the brush is limited in its axial movement by engagement with the riser portion 40 in one direction and is limited in its movement in the other direction by the insulating washer 86.

The present invention also has many additional advantages. The one-piece brush holder, together with the washer, eliminates the four individual brush holders ordinarily employed in a conventional dynamoelectric machine. In addition, all riveting operations that were previously employed have been eliminated, as well as, various insulating members that must be employed to insulate the rivets and the individual brush holders from the stator or frame of the machine. Moreover, with the present invention, any need for the conventional holes or apertures in the frame of the dynamoelectric machine is eliminated since there is no need to reach these brushes from a radially outward position of the machine. The brushes may be assembled, may be checked and replaced by reaching them in an axial direction.

As was explained previously, the brushes are assembled into the machine from an axial direction prior to the mounting of the end bell or cap. Similarly, in service, the end bell or cap may be removed by removing the through bolts that hold it in place and the brushes are easily accessible. By eliminating these radially extending holes that are present in conventional machines, it becomes possible to extrude the frame 14 or to make it out of flat stock, roll it and then weld it along one seam.

As can be appreciated from the description of the assembly of the brush holder and the brushes into the machine, this assembly operation is very easy and straightforward. As a result, the cost of assembling the dynamoelectric machine of the present invention is substantially lower than the cost of assembling a conventional dynamoelectric machine.

Thus, the present invention provides a very inexpensive and uncomplicated brush holding means for a dynamoelectric machine that not only is less expensive with respect to its component parts than a conventional machine, but also is less expensive to assemble.

I claim:

1. In a dynamoelectric machine, a stator including a frame, a rotor rotatably mounted within said stator, said rotor comprising a current collector member having a generally cylindrical portion the axis of which extends in a direction generally parallel to the axis of said stator and a riser portion extending radially from said generally cylindrical portion, a brush holder having a central opening therein said brush holder having a plurality of slots extending radially outwardly from said central opening, cooperating means on said frame and on said brush holder for positioning said brush holder in said stator in a position where said generally cylindrical portion of said current collector member extends through said central opening in said brush holder, a brush positioned in each of said slots, said riser limiting the movement of each of said brushes in one axial direction, a metallic end cap for said stator engaging said frame, an insulator positioned over one end of said stator intermediate said brushes and said end cap limiting the axial movement of each of said brushes in the other direction.

2. The combination of claim 1 in which said cooperating means on said stator and said brush holder comprise a plurality of spaced radially inwardly extending tabs positioned on said frame and a plurality of complementary axially extending slots positioned in said brush holder, each of said slots having an end wall positioned over the remote end thereof with respect to said riser.

3. The combination of claim 1 including a plurality of spaced through bolts engaging said metallic end cap and said stator for holding said metallic end cap on said stator, said brush holder having a plurality of slots positioned therein, each of said through bolts extending through one of said slots.

4. The combination of claim 1 including a plurality of spring means, each of said spring means having one portion thereof anchored to said brush holder and another portion thereof engaging one of said brushes for urging each of said brushes radially inwardly into engagement with the cylindrical portion of said current collector member.

5. The combination of claim 2 in which each of said tabs has a radially extending face defining a plane perpendicular to the axis of said cylindrical portion of current collector member, and the end walls of each of said slots define a plane, the end wall of each of said slots engaging a radially extending face on one of said tabs.

6. The combination of claim 5 in which said frame is annular in configuration and said tabs are struck from the inner surface thereof at equally spaced positions around the periphery.

7. A dynamoelectric machine comprising a stator, an armature rotatably mounted within said stator, said armature including a commutator having a cylindrical portion extending generally parallel to the axis of rotation of said armature and a riser portion extending generally perpendicular to said cylindrical portion, a plurality of commutator brushes, a one-piece brush holding means constructed of insulating material mounted within said stator and a central opening positioned therein, said cylindrical portion of said commutator extending through said opening, said brush holder having a plurality of spaced slots extending radially outwardly from said central opening, each of said slots receiving one of said brushes for sliding movement radially with respect to said cylindrical portion of said commutator, spring means engaging said brush holder means and said brushes urging one surface of each of said brushes into engagement with said cylindrical portion of said commutator, said riser portion limiting the axial movement of said brushes in one direction, said stator including an end cap and insulating means positioned between said end cap and said brush holding means for limiting the axial movement of said brushes in the other direction.

8. The combination of claim 7 in which said stator includes a generally annular frame portion having spaced radially inwardly extending means positioned on the inner surface thereof and said brush holder includes means cooperating with said spaced radially inwardly extending means for positioning said brush holder means axially within said annular frame of said stator.

9. The combination of claim 8 in which said radially outwardly extending means on said frame include radially extending face defining a plane substantially perpendicular to the axis of said cylindrical portion of said commutator and said means included in said brush holder means comprises a plurality of slots complementary to said struck-in tabs and having end walls positioned thereover, one surface of which defines a single plane, the end wall of each of said slots engaging the radially extending face on one of said struck-in tabs, the plane defined by said end walls positioned perpendicular to the sidewalls of the slots receiving said brushes.

10. In a dynamoelectric machine, a stator, a frame, a rotor rotatably mounted within said stator, said rotor comprising a current collector member having a generally cylindrical portion the axis of which extends in a direction generally parallel to the axis of said stator and a riser portion extending radially from said generally cylindrical portion, a brush holder having a central opening therein, said brush holder having a plurality of slots extending radially outwardly from said central opening, cooperating means on said stator and on said brush holder for positioning said brush holder in said stator in the position where said generally cylindrical portion of said current collector member extends through said central opening in said brush holder, each of said slots receiving one of said brushes for sliding movement radially with respect to said cylindrical portion of said commutator, means engaging said brush holder and said brushes for urging one surface of each of said brushes into engagement with said cylindrical portion of said current collector member, said riser limiting the movement of each of said brushes in one axial direction, and an end cap for the dynamoelectric machine including an insulating means supported by said stator in a position to limit the axial movement of said brushes in the other direction.